United States Patent
Zhu et al.

(10) Patent No.: US 7,554,773 B2
(45) Date of Patent: Jun. 30, 2009

(54) MICRO-ACTUATOR, HEAD GIMBAL ASSEMBLY AND DISK DRIVE UNIT WITH THE SAME

(75) Inventors: Li Yan Zhu, Milpitas, CA (US); Ming Gao Yao, GuangDong (CN); Masashi Shiraishi, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 347 days.

(21) Appl. No.: 11/080,657

(22) Filed: Mar. 16, 2005

(65) Prior Publication Data

US 2006/0193086 A1    Aug. 31, 2006

(30) Foreign Application Priority Data

Feb. 28, 2005    (CN) ........................ 2005 1 0052036

(51) Int. Cl.
G11B 5/58 (2006.01)
(52) U.S. Cl. .................................. 360/294.4
(58) Field of Classification Search .............. 360/294.4, 360/234.6
See application file for complete search history.

(56) References Cited

U.S. PATENT DOCUMENTS

| | | | |
|---|---|---|---|
| 5,299,081 A | | 3/1994 | Hatch et al. |
| 5,611,707 A | | 3/1997 | Meynier |
| 5,636,089 A | | 6/1997 | Jurgenson et al. |
| 5,898,544 A | | 4/1999 | Krinke et al. |
| 5,900,691 A | * | 5/1999 | Reuter et al. ................. 310/348 |
| 6,078,473 A | * | 6/2000 | Crane et al. .............. 360/294.3 |
| 6,198,606 B1 | | 3/2001 | Boutaghou et al. |
| 6,538,836 B1 | | 3/2003 | Dunfield et al. |
| 6,617,763 B2 | | 9/2003 | Mita et al. |
| 6,624,984 B2 | | 9/2003 | Lewis et al. |
| 6,671,131 B2 | | 12/2003 | Kasajima et al. |
| 6,700,727 B1 | | 3/2004 | Crane et al. |
| 6,700,749 B2 | | 3/2004 | Shiraishi et al. |
| 6,851,120 B2 | * | 2/2005 | Crane et al. .................. 720/674 |
| 6,879,468 B2 | * | 4/2005 | Nakamura et al. ......... 360/294.1 |
| 6,950,266 B1 | | 9/2005 | McCaslin et al. |
| 6,956,683 B2 | * | 10/2005 | Heaton et al. ................ 359/198 |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—Jefferson Evans
(74) *Attorney, Agent, or Firm*—Nixon & Vanderhye (57) ABSTRACT

A HGA of the invention includes a slider; a micro-actuator to adjust the position of the slider; and a suspension to load the slider and the micro-actuator. The micro-actuator includes two side arms; a load plate for supporting the slider, which is connected with at least one of the side arms; a piezoelectric element connected with the side arms; and a base shaft to couple with the suspension, which is connected with the side arms and positioned between the load plate and the piezoelectric element. The invention also discloses a disk drive unit using such a HGA.

19 Claims, 12 Drawing Sheets

U.S. PATENT DOCUMENTS

| | | | |
|---|---|---|---|
| 7,006,332 B2 * | 2/2006 | Nakamura et al. | 360/294.3 |
| 7,051,424 B2 * | 5/2006 | Yao et al. | 29/603.06 |
| 7,130,160 B2 * | 10/2006 | Kwon et al. | 360/294.7 |
| 7,183,696 B2 * | 2/2007 | Yamazaki et al. | 310/328 |
| 7,224,099 B2 * | 5/2007 | Magnussen et al. | 310/311 |
| 2003/0147177 A1 | 8/2003 | Yao et al. | |
| 2003/0147181 A1 | 8/2003 | Shiraishi et al. | |
| 2003/0168935 A1 | 9/2003 | Ogawa et al. | |
| 2003/0202292 A1 * | 10/2003 | Arya et al. | 360/294.4 |
| 2004/0136117 A1 * | 7/2004 | Kuwajima et al. | 360/294.4 |
| 2006/0023338 A1 | 2/2006 | Sharma et al. | |
| 2006/0050442 A1 | 3/2006 | Yao et al. | |
| 2006/0072247 A1 | 4/2006 | Yao et al. | |
| 2006/0082917 A1 | 4/2006 | Yao et al. | |
| 2006/0098347 A1 | 5/2006 | Yao et al. | |
| 2006/0146449 A1 | 7/2006 | Yao et al. | |

FOREIGN PATENT DOCUMENTS

| | | |
|---|---|---|
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

MICRO-ACTUATOR, HEAD GIMBAL ASSEMBLY AND DISK DRIVE UNIT WITH THE SAME

FIELD OF THE INVENTION

The present invention relates to disk drive units, and particularly relates to a rotation-type micro-actuator and a head gimbal assembly with such micro-actuator.

BACKGROUND OF THE INVENTION

Figure 1A:
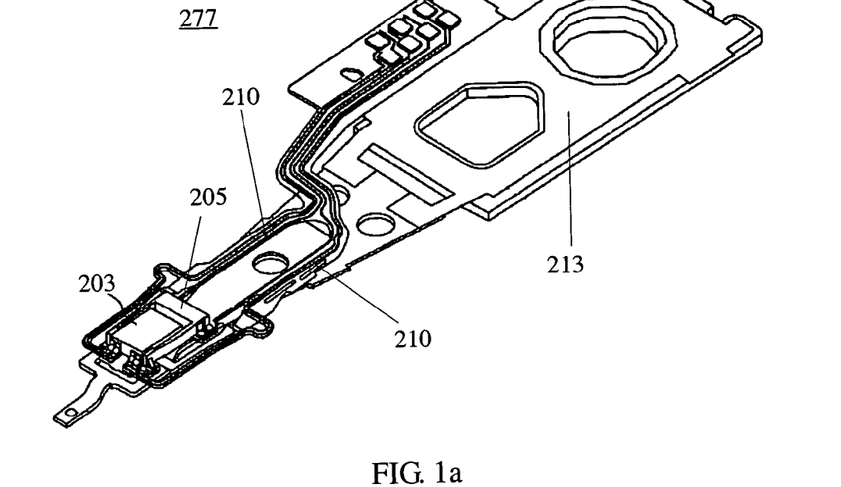
FIG 1a is a perspective view of a HGA of related art.

Disk drives are information storage devices that use magnetic media to store data. Referring to FIG. 1a, a typical disk drive in related art has a magnetic disk and a drive arm to drive a head gimbal assembly 277 (HGA) (the HGA 277 has a suspension (not labeled) with a slider 203 mounted thereon). The disk is mounted on a spindle motor which causes the disk to spin. The drive arm is provided with a voice-coil motor (VCM) for controlling controlling the slider 203 to move from track to track across the surface of the disk to read data from or write data to the disk.

However, because of its large inertia the VCM has limited bandwidth. Thus the slider 203 can not attain a quick and fine position control which will affect the slider 203 to read data from and write data to the magnetic disk.

To solve the above-mentioned problem, piezoelectric (PZT) micro-actuators are now utilized to modify the displacement of the slider 203. That is, the PZT micro-actuator corrects the displacement of the slider 203 on a much smaller scale, and with higher frequency components than the VCM. It enables a smaller recording track width, hence increasing the 'tracks per inch' (TPI) value by 50%. It also reduces the head seeking and settling time. Both the disk surface recording density and drive performance are improved.

Figure 1B:
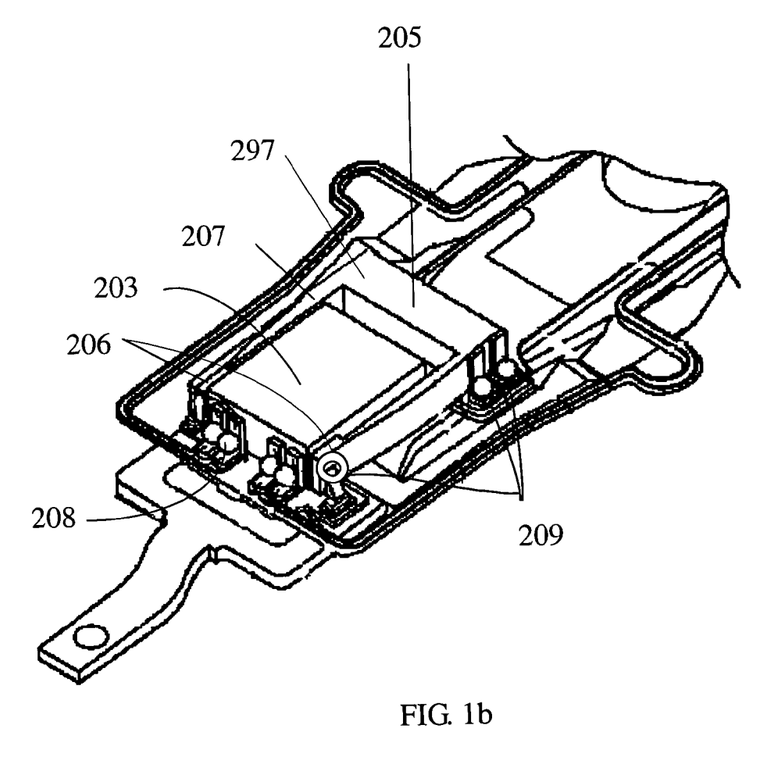
Figure 1C:
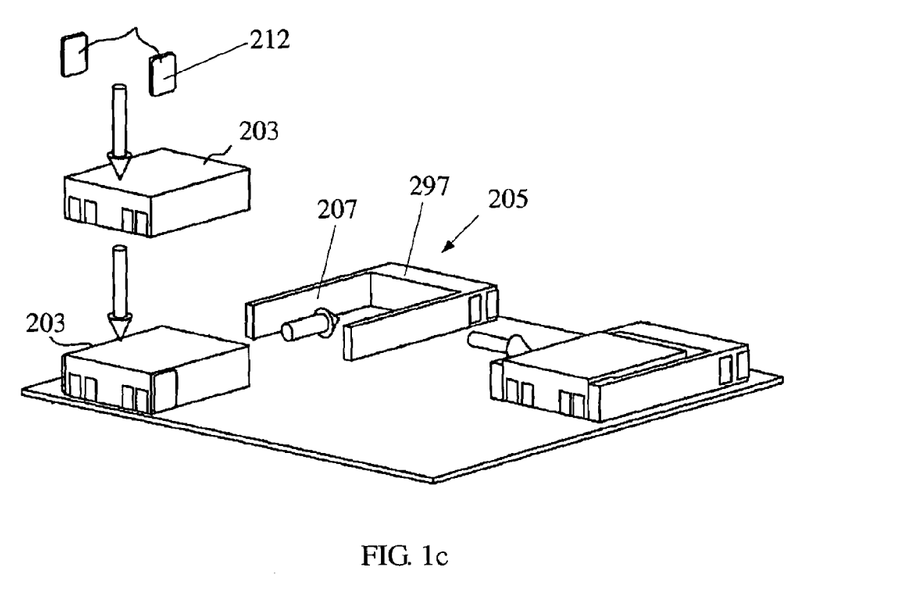

Referring to FIG 1b, a traditional PZT micro-actuator 205 comprises a ceramic U-shaped frame 297 which comprises two ceramic beams 207 each of which having a PZT piece (not labeled) for actuation. With reference to FIGS. 1a and 1b, the PZT micro-actuator 205 is physically coupled to a suspension 213, and there are three electrical connection balls 209 (gold ball bonding or solder ball bonding, GBB or SBB) to couple the micro-actuator 205 to the suspension traces 210 in each one side of the ceramic beam 207. In addition, there are four metal balls 208 (GBB or SBB) to couple the slider 203 to the suspension traces 210 for electrical connection of the read/write transducers. FIG 1c shows a detailed process of inserting the slider 203 into the micro-actuator 205. The slider 203 is bonded with the two ceramic beams 207 at two points at the opening of the U-shaped frame by epoxy dots 212. The slider 203 and the frame 297 mutually form a rectangular hollow structure. The bottom of the U-shape frame 297 is attached to a suspension tongue (not shown in FIG. 1c) on the suspension. The slider 203 and the beams 207 are not directly connected to the suspension and thus move freely with respect to the suspension.

When an actuating power is applied through the suspension traces 210, the PZT pieces on the ceramic beams 207 will expand or contract, causing the two ceramic beams 207 to bend in a common lateral direction. The bending causes a shear deformation of the frame 297. Its rectangular shape becomes approximately a parallelogram. The slider 203 undergoes a lateral translation, because it is attached to the moving side of the parallelogram. Thus a fine head position adjustment can be attained.

Figure 2:
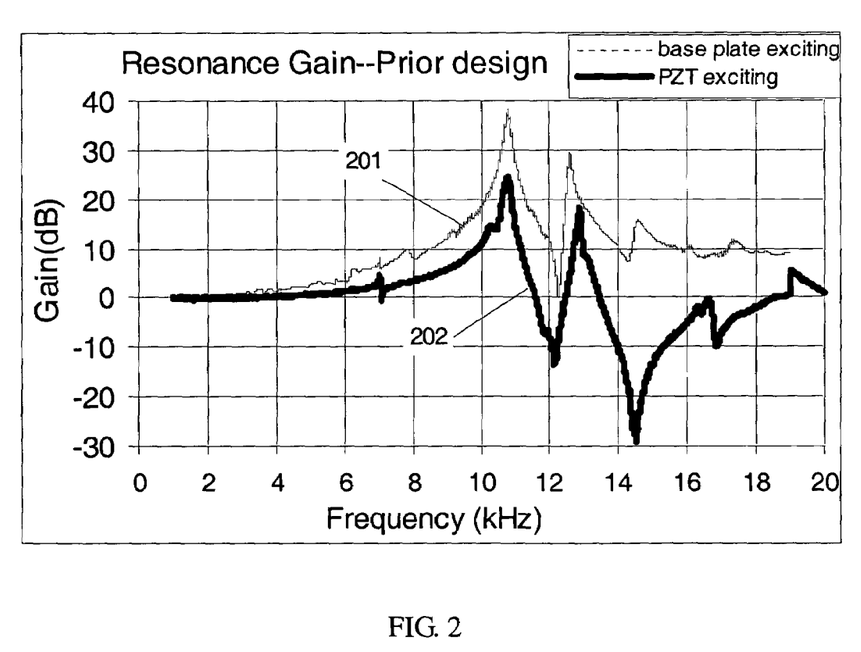

However, translation of the slider 203 generates a lateral intertia force which causes a suspension vibration resonance which has a same resonance effect as shaking the suspension base plate. This will affect the dynamic performance of the HGA and limit the servo bandwidth and the capacity improvement of HDD. As shown in FIG. 2, numeral 201 represents a resonance curve when shaking the suspension base plate and numeral 202 represents a resonance curve when exciting the micro-actuator 205. Under a frequency of 20K, there are several large peaks and valleys in the suspension frequency response, which indicate a bad characteristic of resonance. The figure clearly shows the above-mentioned problem.

Hence, it is desired to provide a micro-actuator, head gimbal assembly, disk drive to solve the above-mentioned problems.

SUMMARY OF THE INVENTION

A main feature of the present invention is to provide a HGA which can attain a good resonance performance and position adjusting performance.

Another feature of the present invention is to provide a micro-actuator having a simple structure and a good position adjusting performance.

A further feature of the present invention is to provide a disk drive unit with wide servo bandwidth and large stroke.

To achieve the above-mentioned features, according to an embodiment of the invention, a HGA comprises a slider; a micro-actuator to adjust the position of the slider; and a suspension to load the slider and the micro-actuator. The micro-actuator comprises two side arms; a load plate for supporting the slider, which is connected with at least one of the side arms; a piezoelectric element connected with the side arms; and a base shaft to couple with the suspension, which is connected with the side arms and positioned between the load plate and the piezoelectric element.

In an embodiment, the load plate comprises a support plate connected with the slider; two connecting plates connecting with the support plate to connect with the two side arms, respectively. The support plate comprises two support portions and a connecting portion to connect with the two support portions. The two connecting plates are respectively connected with symmetrical positions about a center of the support plate's gravity. The connecting plates have a more flexible portion than that of the support plate, the more flexible portion can be attained from a narrower width or a thinner thickness or shape. In an embodiment, the base shaft has at least one narrower portion adjacent to its ends.

According to an embodiment of the invention, the support shaft is integrally formed with the side arms. The slider is partially fixed by the load plate, for example, it is coupled with the two support portions of the load plate. In another embodiment, only the base shaft is partially fixed to the suspension by such as laser welding. One of the side arms is parallel to the other side arm. The load plate is connected with the symmetrical positions about a center of opposed surface of air bearing surface of the slider. Two gaps are respectively formed between the load plate and the suspension, and between the piezoelectric element and the suspension. In addition, a plurality of electric pads are provided on the piezoelectric element to electrically connect with the suspension.

A micro-actuator of the invention comprises two side arms; a load plate connected with at least one of the side arms; a piezoelectric element connected with the side arms; and a base shaft to couple with the suspension, which is connected with the side arms and positioned between the load plate and the piezoelectric element. In the present invention, the piezoelectric element is thin film piezoelectric element or ceramic piezoelectric element. The piezoelectric element comprises a PZT layer with a single-layer structure or a multi-layer structure. In a further embodiment, the PZT element further comprises a substrate layer connected with the PZT layer.

A disk drive unit of the invention comprises a HGA; a drive arm to connect with the head gimbal assembly; a disk; and a spindle motor to spin the disk. The HGA comprises a slider; a micro-actuator to adjust the position of the slider; and a suspension to load the slider and the micro-actuator. The micro-actuator comprises two side arms; a load plate for supporting the slider, which is connected with at least one of the side arms; a piezoelectric element connected with the side arms; a base shaft to couple with the suspension, which is connected with the side arms and positioned between the load plate and the piezoelectric element.

Compared with the prior art, the micro-actuator of the present invention only need one PZT element to adjust the position of the slider so that the manufacturing cost is low down and the manufacturing process is simplified. In addition, the two side arms of the invention rotate in opposite directions. Thus, the slider undergoes a pure rotation. By keeping the slider's center of gravity stationary, less power is required for micro-actuation because the read/write transducer is located at the distal end of the slider. Thus, a larger head position adjustment capacity can be attained without increasing the power of micro-actuation. Furthermore, the micro-actuator of the present invention imparts only a small moment, and no inertia force on the suspension. The suspension resonance due to the micro-actuation is reduced. Desirably, the servo bandwidth is improved and the HDD storage capacity is increased.

For the purpose of making the invention easier to understand, several particular embodiments thereof will now be described with reference to the appended drawings in which:

DESCRIPTION OF THE DRAWINGS

FIG 1b is an enlarged, partial view of FIG 1a;

FIG 1c shows a detailed process of inserting a slider to a micro-actuator of the HGA in FIG 1a;

FIG. 2 shows a resonance curve of the HGA of FIG. 1a;

FIG. 5 is an exploded view of FIG. 4a;

DETAILED DESCRIPTION OF THE INVENTION

Figure 3:
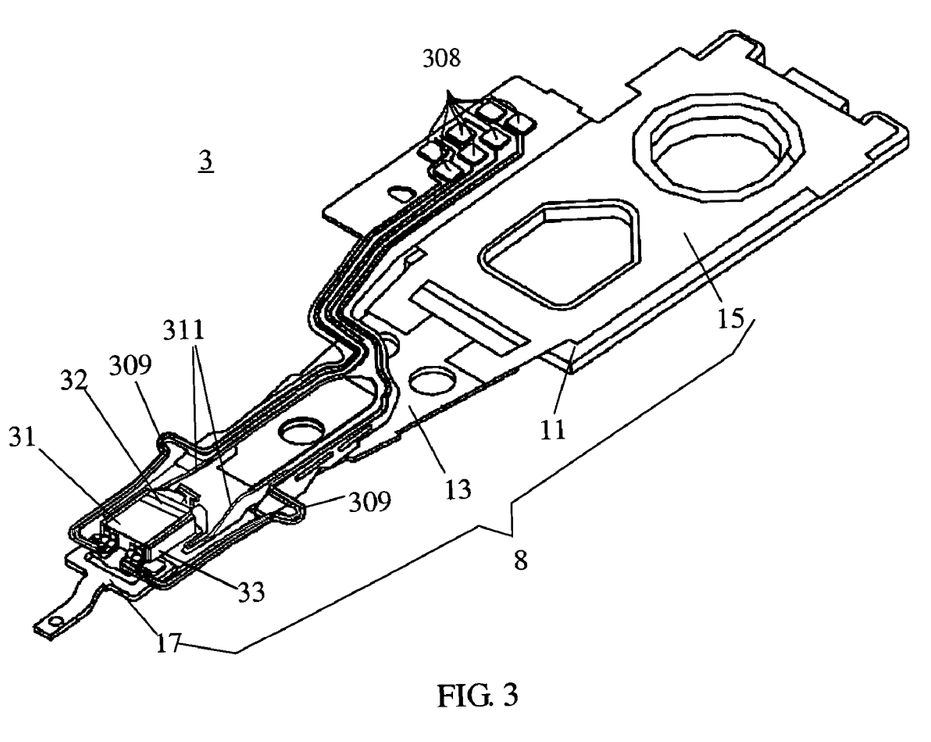
FIG. 3 is a perspective view of a HGA according to a first embodiment of the present invention.

Referring to FIG. 3, a head gimbal assembly (HGA) 3 of the present invention comprises a slider 31, a micro-actuator 32 and a suspension 8 to load the slider 31 and the micro-actuator 32.

Figure 4A:
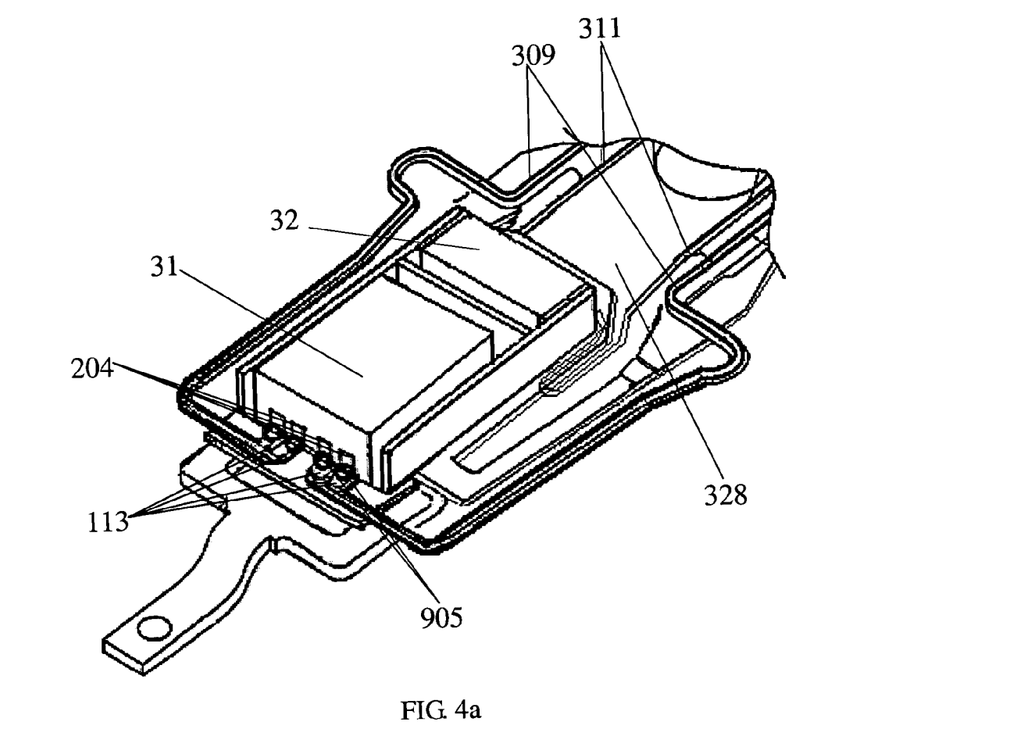
FIGS. 4a and 4b are enlarged, partial perspective view of the HGA of FIG. 3 according to different view angles.
Figure 4B:
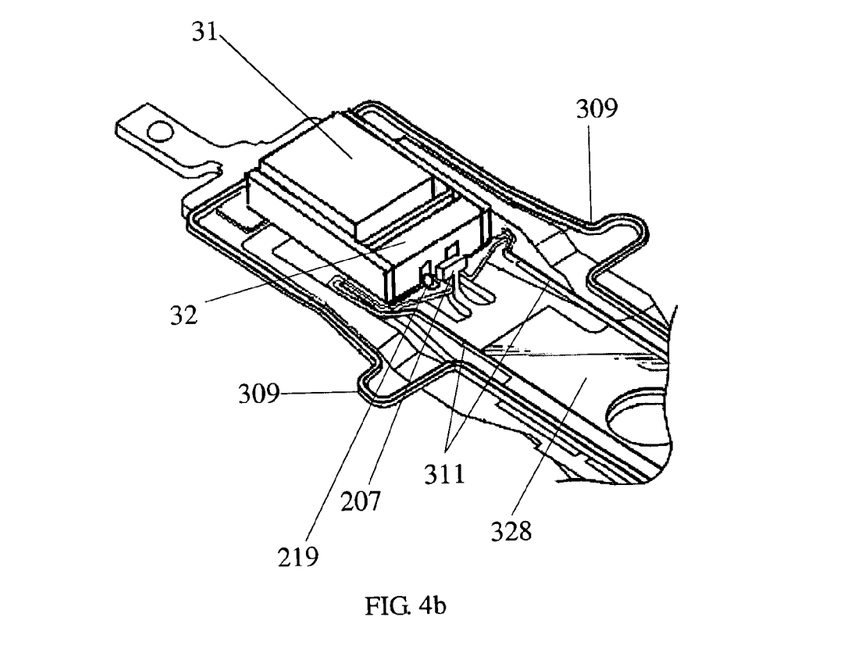
Figure 5:
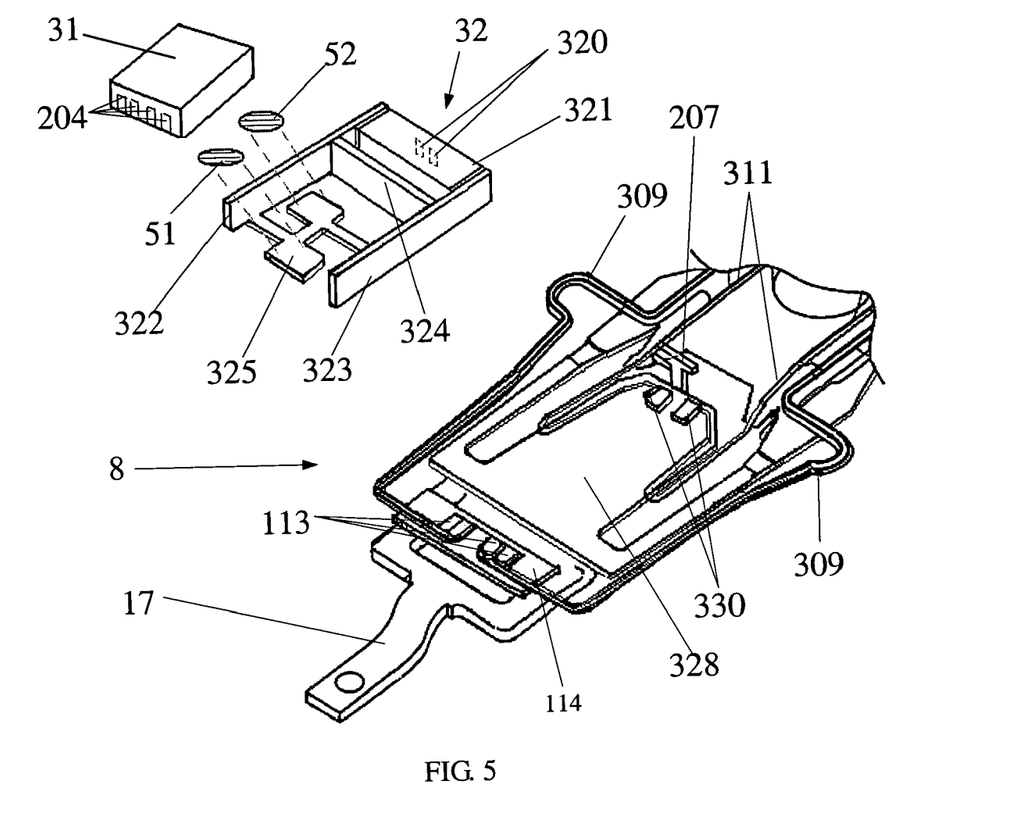
Figure 6:
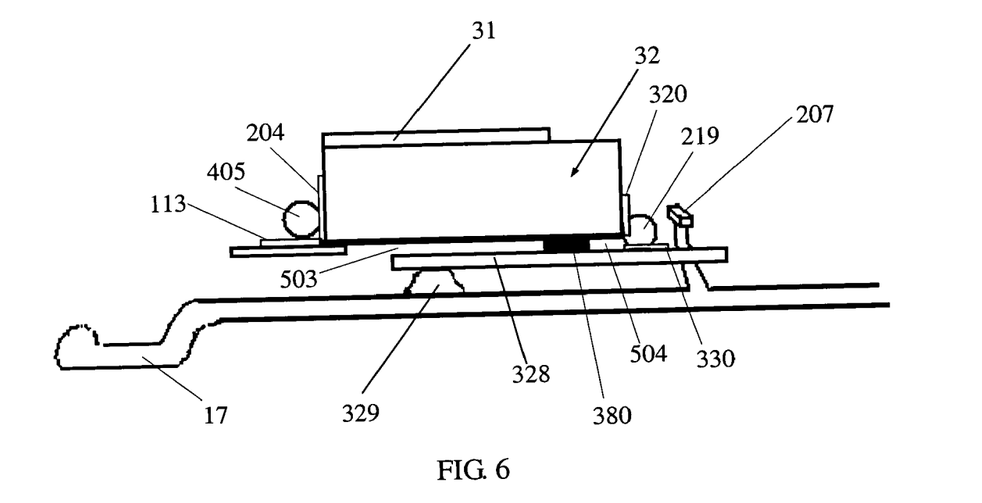
FIG. 6 is a partial, side view of the HGA of FIG. 3 in micro-actuator area.

Also referring to FIG. 3, the suspension 8 comprises a load beam 17, a flexure 13, a hinge 15 and a base plate 11. On the flexure 13 a plurality of connection pads 308 are provided to connect with a control system (not shown) at one end and a plurality of electrical multi-traces 309, 311 are provided in the other end. Referring to FIGS. 4a, 4b and 5, the flexure 13 also comprises a suspension tongue 328 which are used to support the micro-actuator 32 and the slider 31. Referring to FIG. 6, the load beam 17 has a dimple 329 formed thereon to support the suspension tongue 328.

Referring to FIGS. 4b and 5, a limiter 207 is formed on the load beam 17 which extends through the suspension tongue 328 for preventing the suspension tongue 328 from being bent overly during normal operation of disk drive or any shock or vibration happening to the disk drive. Thus the HGA 3 can attain a good shock performance. In the invention, the suspension tongue 328 has a plurality of electrical bonding pads 113 and 330 formed thereon. The electrical bonding pads 113 are connected with the multi-traces 309 while the electrical bonding pads 330 are connected with the multi-traces 311. The slider 31 also has a plurality of electrical bonding pads 204 on an end thereof corresponding to the electrical bonding pads 113 of a moving part 114 of the suspension tongue 328.

Figure 7:
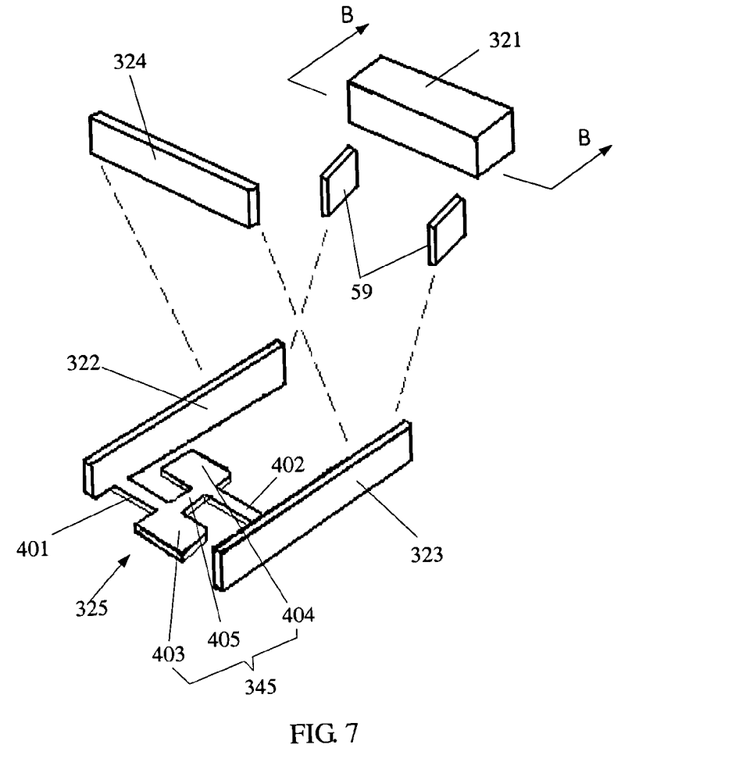
FIG. 7 is an exploded, perspective view of a micro-actuator of the HGA in FIG. 3.
Figure 9:
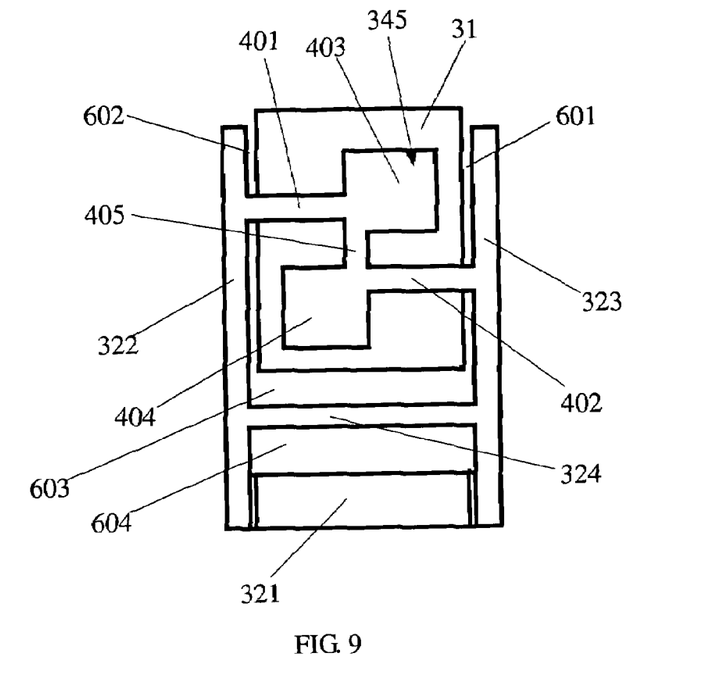
FIGS. 9-11 show a working principle of the micro-actuator of the HGA in FIG. 3.

In the present invention, referring to FIGS. 5 and 7, the micro-actuator 32 comprises two side arms 322, 323, a load plate 325 for supporting the slider 31, a piezoelectric (PZT) element 321 connected with the side arms 322, 323, and a support shaft 324. In a preferred embodiment, the support shaft 324 is made of flexible material. In the present Invention, the load plate 325 is also connected with the side arms 322, 323, and the support shaft 324 is connected with the side arms 322, 323 and positioned between the load plate 325 and the piezoelectric element 321. Referring to FIG. 9, a clearance 603 is formed between the support shaft 324 and the load plate 325; and another clearance 604 is formed between the support shaft 324 and the PZT element 321. Referring to FIG. 6, the support shaft 324 is partially bonded to the suspension tongue 328 with its middle portion by traditional medium 380, such as epoxy, adhesive, etc., so that two gaps 503, 504 are formed between the micro-actuator 32 and the suspension tongue 328, which are positioned at two sides of the traditional medium 380. In the present invention, because the existence of two gaps 503, 504 will make the slider 31 and the PZT element 321 hang above the suspension tongue 328, thus preventing an additional vibration to the suspension 8 when exciting the micro-actuator 32.

According to a first embodiment of the invention, as shown in FIGS. 5 and 7, the load plate 325 comprises a support plate 345 connected with the slider 31; two connecting plates 401, 402 extending from the support plate 345 to connect with the two side arms 322, 323, respectively. In a preferred embodiment, the two connecting plates 401, 402 are connected with symmetrical positions about a center of the support plate's 345 gravity. Because of the special connecting method, the support plate 345 will be rotated when the connecting plates 401, 402 being exerted with pressure or pull force. In order to easily rotate the support plate 345, in an embodiment, the connecting plates 401, 402 have a narrower width than that of the support plate 345. In a further embodiment, the support plate 345 comprises two support portions 403, 404 and a connecting portion 405 to connect with the two support portions 403, 404. The connecting portion 405 has a narrower width (or a thinner thickness or shape) than that of the support portion 403 or 404. Obviously, the support plate 345 is not limited to such a structure; any suitable structure can be used for the support plate 345 to attain a same effect.

Referring to FIGS. 5 and 7, in an embodiment of the micro-actuator 32, the load plate 325 and the side arms 322, 323 are integrally formed; the support shaft 324 is bonded with the side arms 322, 323 by traditional method, such as soldering, adhesive bonding, or laser bonding. In a preferred embodiment, the side arm 322 is parallel to the side arm 323, and the support shaft 324 is perpendicular to the two side arms 322, 323. In the invention, the PZT element 321 is bonded to the two side arms 322, 323 with its two ends by two epoxy dots 59. Understandably, the epoxy dots 59 can be replaced by adhesive or ACF (anisotropic conductive film).

Figure 7A:
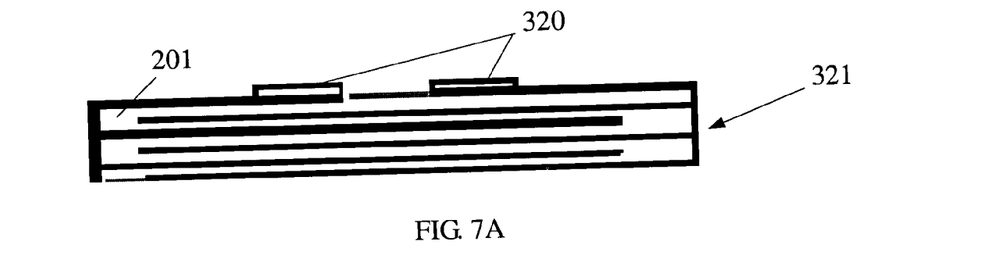
FIG. 7A is an enlarged, top view of FIG. 7.
Figure 8:
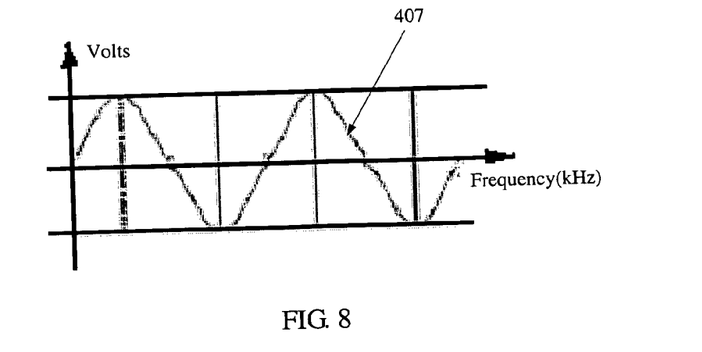
FIG. 8 shows a waveform of voltage which is applied to a PZT element of the micro-actuator in FIG. 7.

Referring to FIGS. 7 and 7A, the PZT element 321 is substantially a PZT layer 201, which has two electrical bonding pads 320 formed on one side thereof corresponding to the electrical bonding pads 330 of the suspension tongue 328. In an embodiment, as shown in FIG. 7A, the PZT layer 201 has a multi-layer structure laminated with two kinds of electrodes alternatively. The multi-layer structure of the PZT layer 201 will enhance the capacity of the micro-actuator 32 to adjust the position of the slider 31. Alternatively, the PZT layer 201 can have a single-layer structure. In the present invention, the PZT element 321 may be thin film PZT elements or ceramic PZT elements. The side arms 322, 323, the load plate 325 can be made of metal (i.e. stainless steel), ceramic, or polymer. In an embodiment, the support shaft 324 is made of a flexible material.

During assembly, firstly, referring to FIG. 7, in an embodiment of the present invention, the support shaft 324, the PZT element 321 and a frame integrally formed by the two side arm 322, 323 and the load plate 325 are assembled together to form the micro-actuator 32. At the time, two electrical bonding pads 320 of the PZT element 321 are exposed outwardly. Then, referring to FIG. 5, the slider 31 is partially bonded to the load plate 325 of the micro-actuator 32 using two epoxy dots 51, 52. At the status, the slider 31 has its center well matched with the center of the support plate 345. After that, referring to FIGS. 4a, 4b, 5 and 6, the support shaft 324 is partially bonded to the suspension tongue 328 with its middle portion by epoxy, adhesive or ACF so that the micro-actuator 32 with the slider 31 is assembled with the suspension 8. At the time, the slider 31 also has its center well matched with the dimple 329 of the load beam 17, it will keep the load force of the suspension 8 always being applied to the center of the slider 31 when the slider 31 flies on a disk (not shown). Also, the electrical bonding pads 204 of the slider 31 and the electrical bonding pads 320 of the PZT element 321 are respectively positioned corresponding to the electrical bonding pads 113, 330 of the suspension tongue 328. Then, a plurality of metal balls 905 (GBB, SBB or soldering paste) are used to electrically connect the electrical bonding pads 204 of the slider 31 with the electrical bonding pads 113 of the suspension tongue 328; simultaneously, a plurality of metal balls 219 (GBB, SBB or soldering paste) are used to electrically connect the electrical bonding pads 320 of the PZT element 321 with the electrical bonding pads 330 of the suspension tongue 328. Thus the micro-actuator 32 is electrically connected with the two electric multi-traces 311 of the suspension 8 while the slider 31 is electrically connected the two electric multi-traces 309 of the suspension 8. Through the electric multi-traces 309, 311, the slider 31 and the micro-actuator 32 are electrically connect with and controlled by the control system (not shown) through the connection pads 308.

In another embodiment, the support shaft 324 may be partially bonded to the suspension tongue 328 with its middle portion by laser welding. The laser welding process will make the bonding between the support shaft 324 and the suspension tongue 328 more firmly, and also reduce the variation of manufacturing process.

In the present invention, referring to FIG. 9, the width of the slider 31 is preferably less than the distance between the two side arms 322 and 323. Thus two parallel gaps 601, 602 are formed between the slider 31 and the two side arms 322, 323 so as to assure a free movement of the slider 31 between the two side arms 322, 323. In addition, because the slider 31 has a partial bonding method with the two side beams 322, 323, it will move freely when being driven by the micro-actuator 32.

Figure 10:
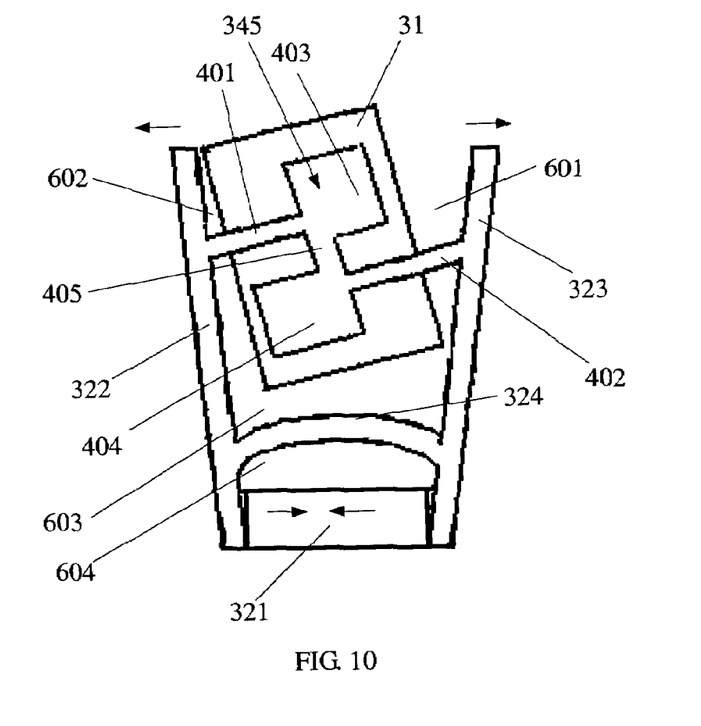
Figure 11:
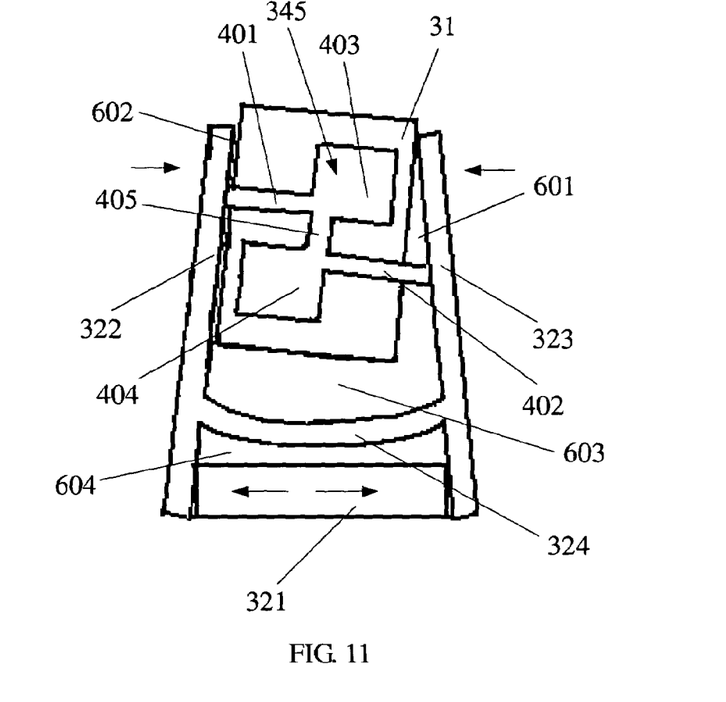

Taking injunction with FIGS. 8-11, the following gives a detail description of how the micro-actuator 32 works. When no voltage is applied to the PZT element 321, the micro-actuator 32 will stay in its initial status, as shown in FIG. 9. Referring to FIG. 11, when a sine voltage 407 is applied to the PZT element 321, in a first half period, the PZT element 321 will expand with the drive voltage increasing. Because the PZT element 321 is connected with the side beams 322, 323 with its two ends, the expansion of the PZT element 321 will push the connecting ends of the side beams 322, 323 with the PZT element 321 outwardly, in the meantime, the other ends of the side arms 322, 323 adjacent to the slider 31 are push inwards and the support shaft 324 is arched toward the PZT element 321 because the middle portion of the flexible support shaft 324 is fixed to the suspension tongue 328. In the invention, because the two connecting plates 401, 402 are connected with the two side arms 322, 323 in symmetrical positions about a center of the support plate's gravity, so the two connecting plates 401, 402 will generate a rotation torque exerted to the support plate 345 when the ends of two side arms 322, 323 adjacent to the slider 31 are pushed inwards. The rotation torque will make the support plate 345 rotate clockwise. In the invention, the slider 31 will also rotate clockwise for being mounted on the support plate 345. When the drive voltage go up to max value and drop to zero, the slider 31 will make a largest displacement and then back to its original position. As an embodiment, the slider 31 is partially bonded to the support portions 403, 404 of the support plate 345 with epoxy dots 51, 52; the connecting plate 401 and the support portions 403 are adjacent to the trailing side of the slider 31, and the connecting plate 402 and the support portions 404 are adjacent to the leading side of the slider 31. So the rotation torque from the connecting plates 401, 402 will push the trailing side of the slider 31 in a first direction and push the leading side of the slider 31 in a second direction opposed to the first direction so as to attain a good head position adjustment.

Referring to FIG. 10, in a second half period, the PZT element 321 will contract with the negative drive voltage increasing. The contraction of the PZT element 321 will pull the connecting ends of the side beams 322, 323 with the PZT element 321 inwardly, in the meantime, the other ends of the side arms 322, 323 adjacent to the slider 31 are push outwards and the support shaft 324 is arched toward the slider 31. Then, the two connecting plates 401, 402 will generate a rotation torque exerted to the support plate 345 when the ends of two side arms 322, 323 adjacent to the slider 31 are pushed outwards. The rotation torque will make the support plate 345 and then the slider rotate counter-clockwise. When the drive voltage go up to negative max value and drop to zero, the slider 31 will make a largest displacement and then back to its original position.

Figure 12:
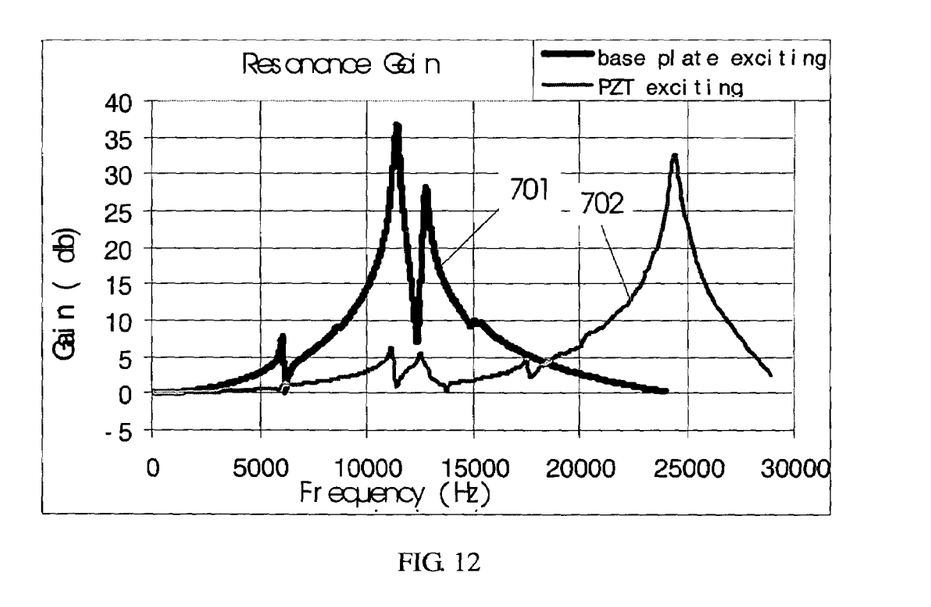
FIGS. 12-13 are resonance curves of the HGA of FIG. 3.
Figure 13:
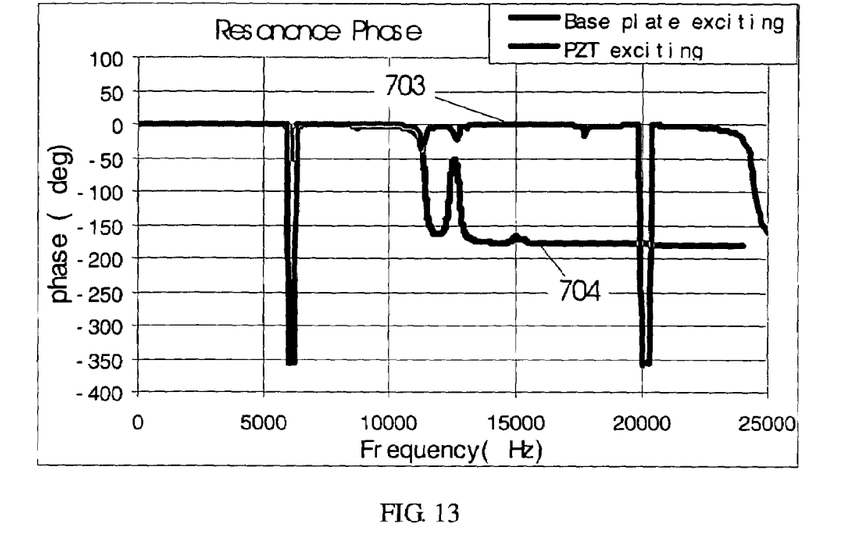

FIGS. 12-13 show a testing result of the resonance performance of the HGA 3 of the invention. Here, numeral 702 shows a micro-actuator operation (PZT exciting) resonance gain curve, which has a phase 703, and numeral 701 shows a base plate exciting resonance gain curve, which has a phase 704. It shows that a suspension resonance has not happened in a low frequency (no torsion model and sway model), but only a pure micro-actuator resonance happened in a high frequency when exciting the PZT micro-actuator 32, this would enlarge the servo bandwidth and improve the capacity of the HDD, reduce the slider seeking and settling time.

Figure 14:
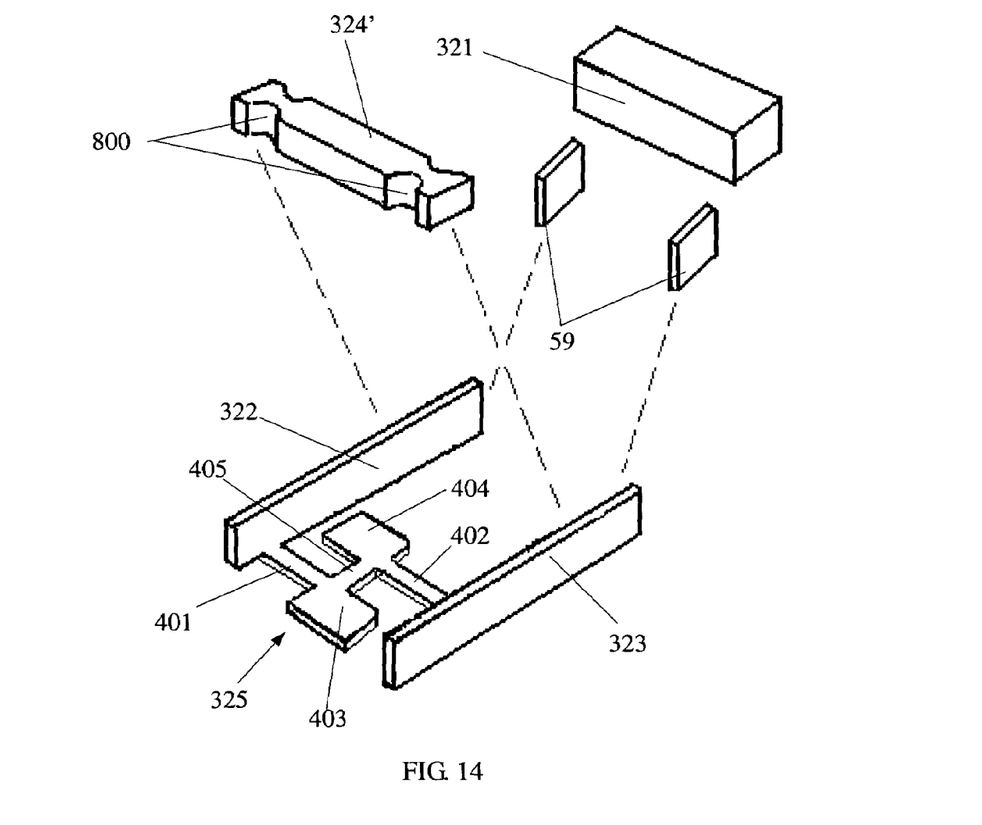
FIG. 14 is an exploded, perspective view of a micro-actuator according to a second embodiment of the invention.
Figure 15:
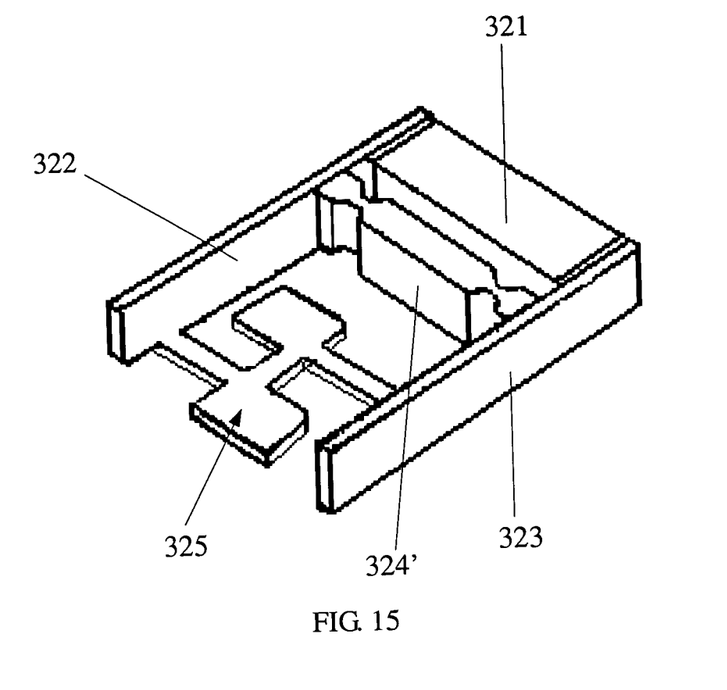
FIG. 15 is an assembled view of FIG. 14.

According to a second embodiment of the invention, referring to FIGS. 14-15, the micro-actuator of the invention can substitute the support shaft 324' for the support shaft 324. The support shaft 324' comprises a rigid middle portion and two neck portions 800 adjacent to its ends. When the PZT element 321 is excited, the support shaft 324' will deform at the positions of the neck portions 800.

Figure 16:
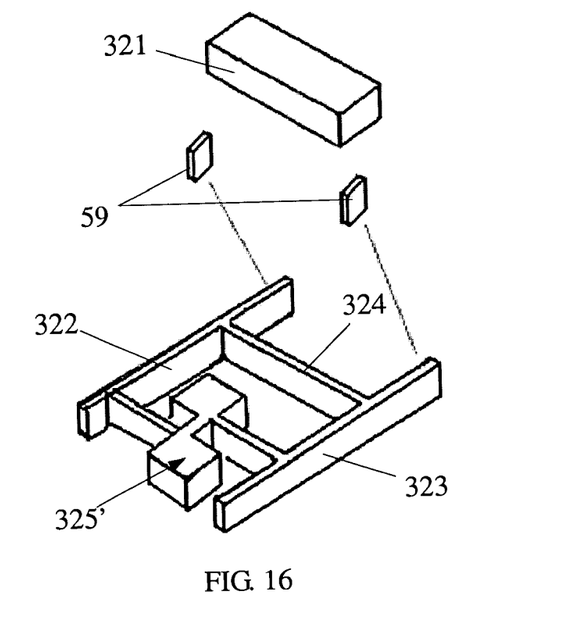
FIG. 16 and FIG. 17 are exploded, perspective views of two micro-actuator according to two embodiments of the invention
Figure 17:
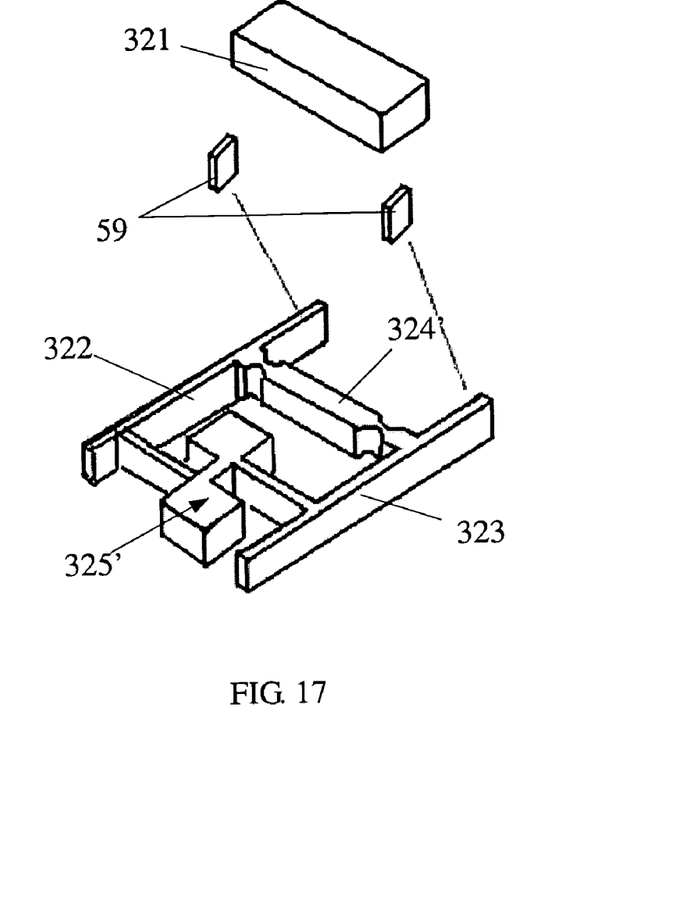

According to a third embodiment of the invention, referring to FIG. 16, a micro-actuator frame can be an integral structure formed by molding or etching, which comprises a support shaft 324, two side arms 322, 323, and a load plate 325'. The load plate 325', the support shaft 324, and two side arms 322, 323 have a same thickness. According to a fourth embodiment of the invention, referring to FIG. 17, the support shaft 324 of the micro-actuator frame can be formed to have a structure of the support shaft 324'.

Figure 18:
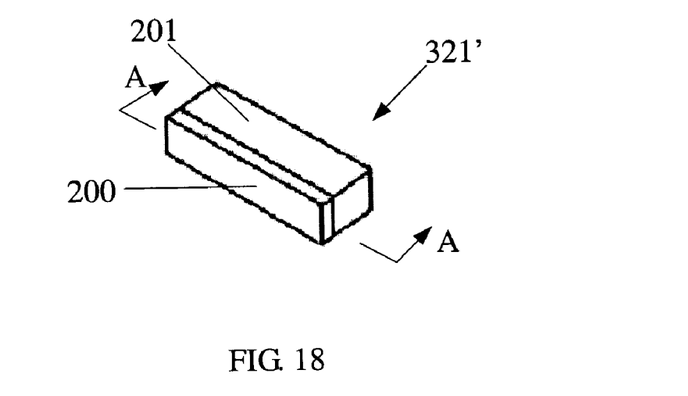
FIG. 18 is a perspective view of a PZT element according to a further embodiment of the invention.
Figure 19:
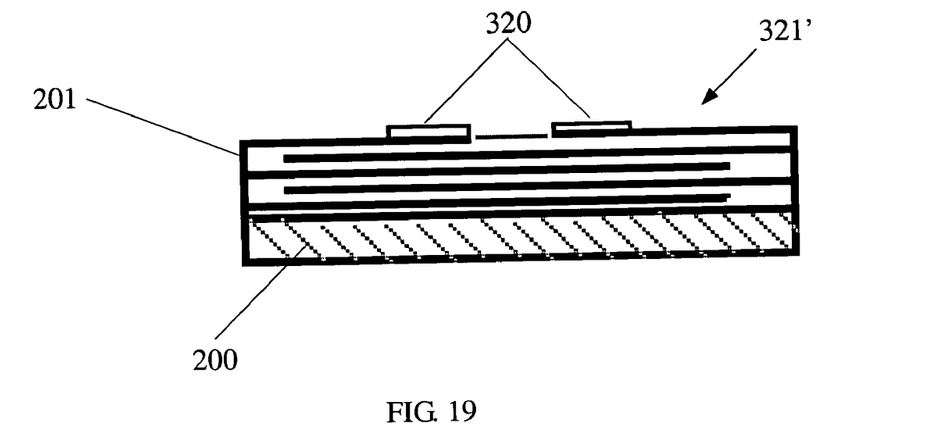
FIG. 19 is an enlarged, top view of FIG. 18.

In a five embodiment, referring to FIGS. 18-19, the PZT element 321 can be replaced by a multi-layer PZT element 321'. The PZT element 321' comprises a substrate layer 200 and the PZT layer 201. The substrate layer 200 can be made of ceramic, polymer or metal. The PZT layer 201 may be a single-layer structure or a multi-layer structure. The two electrical bonding pads 320 are formed on the side surface of the PZT layer 201.

In the present invention, one of the side arms 322, 323 is parallel to the other side arm. Understandably, one of the side arms 322, 323 may be not parallel to the other side arm, the micro-actuator still can adjust the position of the slider. In addition, one of the connecting plates 401, 402 may be omitted and the position of the slider 31 still can be adjusted by the micro-actuator.

Compared with the prior art, the micro-actuator of the present invention only need one PZT element to adjust the position of the slider so that the manufacturing cost is low down and the manufacturing process is simplified. In addition, the micro-actuator can rotate both trailing side and leading side of the slider in different directions, while the micro-actuator of the prior art can only move trailing side of the slider like a swing (because its leading side is fixed). So, the present invention can make the slider get a bigger swing than the prior art because both trailing and leading side of the slider can move. Accordingly, a big head position adjustment capacity can be attained. Furthermore, because the micro-actuator is bonded to the suspension only by the support shaft so that two gaps are respectively formed between the suspension and the slider, and between the suspension and the PZT element, thus the resonance performance gets significant improvement when exciting the micro-actuator because no reaction force will be transferred to the suspension. In addition, because suspension resonance has been improved (reduce the resonance peak) in a low frequency when operating the micro-actuator, and only a micro-actuator resonance happened in a high frequency, this would enlarge the servo bandwidth and then improve the capacity of the HDD.

Figure 20:
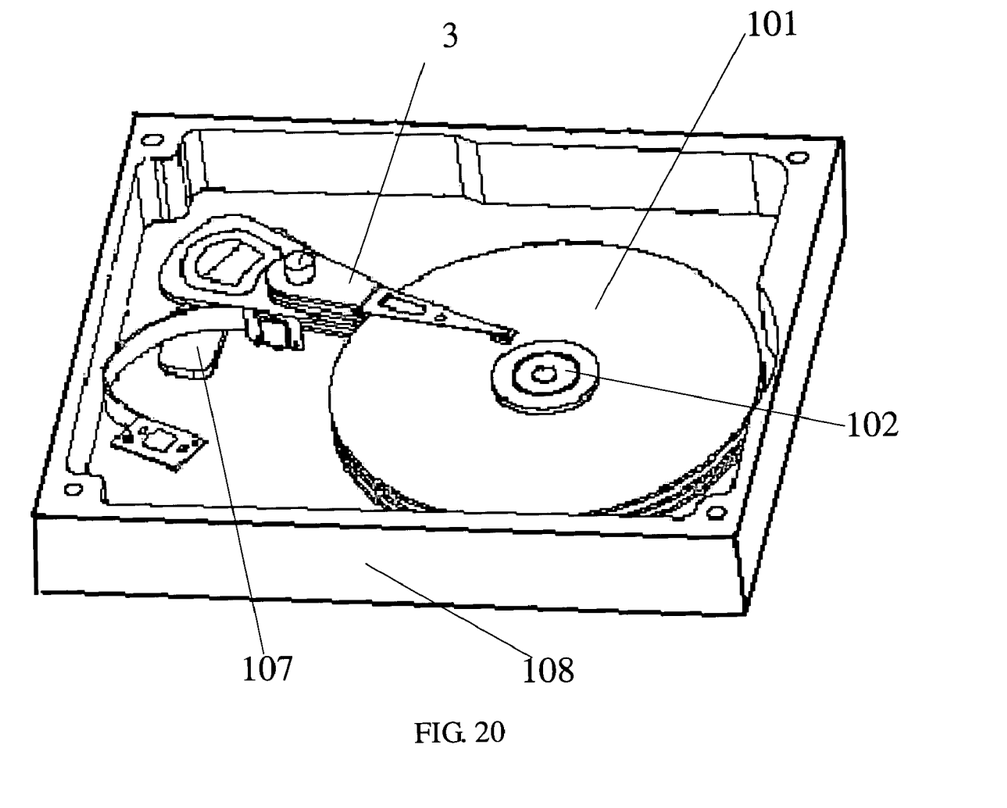
FIG. 20 is perspective view of a disk drive unit according to an embodiment of the invention.

In the present invention, referring to FIG. 20, a disk drive unit of the present invention can be attained by assembling a housing 108, a disk 101, a spindle motor 102, a VCM 107 with the HGA 3 of the present invention. Because the structure and/or assembly process of disk drive unit of the present invention are well known to persons ordinarily skilled in the art, a detailed description of such structure and assembly is omitted herefrom.

What is claimed is:

1. A head gimbal assembly comprising:
    a slider;
    a micro-actuator to adjust the position of the slider; and
    a suspension to load the slider and the micro-actuator;
    wherein the micro-actuator comprises:
    two side arms;
    a load plate for supporting the slider, which is connected with at least one of the side arms;
    a piezoelectric element disposed on the side arms; and
    a base shaft to couple with the suspension, which is connected with the side arms and positioned between the load plate and the piezoelectric element.

2. The head gimbal assembly as claimed in claim 1, wherein the load plate comprises:
    a support plate connected with the slider;
    two connecting plates connecting with the support plate to connect with the two side arms, respectively.

3. The head gimbal assembly as claimed in claim 2, wherein the two connecting plates are respectively connected with symmetrical positions about a center of the support plate's gravity.

4. The head gimbal assembly as claimed in claim 2, wherein the connecting plates have a more flexible portion than that of the support plate.

5. The head gimbal assembly as claimed in claim 1, wherein the base shaft has at least one narrower portion adjacent to its ends.

6. The head gimbal assembly as claimed in claim 5, wherein the load plate is connected with the symmetrical positions about a center of opposed surface of air bearing surface of the slider.

7. The head gimbal assembly as claimed in claim 1, wherein the base shaft is integrally formed with the side arms.

8. The head gimbal assembly as claimed in claim 1, wherein the slider is partially fixed by the load plate.

9. The head gimbal assembly as claimed in claim 1, wherein only the base shaft is fixed with the suspension.

10. A micro-actuator for the disk drive unit comprising:
    two side arms;
    a load plate connected with at least one of the side arms;
    a piezoelectric element disposed on the side arms;
    a base shaft couplable with a suspension of a head gimbal assembly of the disk drive unit, which is connected with the side arms and positioned between the load plate and the piezoelectric element,
    wherein the load plate comprises:
    a support plate connectable to a slider: and
    two connecting plates connecting with the support plate to connect with the two side arms, respectively.

11. The micro-actuator as claimed in claim 10, wherein the two connecting plates are respectively connected with symmetrical positions about a center of the support plate's gravity.

12. The micro-actuator as claimed in claim 10, wherein the connecting plates have a more flexible portion than that of the support plate.

13. The micro-actuator as claimed in claim 10, wherein the base shaft has at least one narrower portion adjacent to its ends.

14. The micro-actuator as claimed in claim 10, wherein the piezoelectric element is thin film piezoelectric element or ceramic piezoelectric element.

15. The micro-actuator as claimed in claim 10, wherein the piezoelectric element comprises a PZT layer with a single-layer structure or a multi-layer structure.

16. The micro-actuator as claimed in claim 15, wherein the piezoelectric element further comprises a substrate layer connected with the PZT layer.

17. The micro-actuator as claimed in claim 10, wherein the support plate comprises two support portions and a connecting portion to connect with the two support portions.

18. A disk drive unit comprising:
a head gimbal assembly;
a drive arm to connect with the head gimbal assembly;
a disk; and
a spindle motor to spin the disk;
wherein the head gimbal assembly comprises:
a slider;
a micro-actuator to adjust the position of the slider; and
a suspension to load the slider, and the micro-actuator;
wherein the micro-actuator comprises:
two side arms;
a load plate for supporting the slider, which is connected with at least one of the side arms;
a piezoelectric element disposed on the side arms; and
a base shaft to couple with the suspension, which is connected with the side arms and positioned between the load plate and. the piezoelectric element.

19. The disk drive unit as claimed in claim 18, wherein the load plate comprises:
a support plate connected with the slider;
two connecting plates connecting with the support plate to connect with the two side arms, respectively.

* * * * *